US011044768B2

(12) United States Patent
Yasukawa et al.

(10) Patent No.: US 11,044,768 B2
(45) Date of Patent: Jun. 22, 2021

(54) USER EQUIPMENT APPARATUS AND SIGNAL RECEPTION METHOD

(71) Applicant: NTT DOCOMO, INC., Tokyo (JP)

(72) Inventors: Shimpei Yasukawa, Tokyo (JP); Hiroki Harada, Tokyo (JP); Satoshi Nagata, Tokyo (JP); Qun Zhao, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/309,863

(22) PCT Filed: Apr. 8, 2015

(86) PCT No.: PCT/JP2015/060996
§ 371 (c)(1),
(2) Date: Nov. 9, 2016

(87) PCT Pub. No.: WO2015/170544
PCT Pub. Date: Nov. 12, 2015

(65) Prior Publication Data
US 2017/0142764 A1     May 18, 2017

(30) Foreign Application Priority Data

May 9, 2014    (JP) .............................. JP2014-098138

(51) Int. Cl.
*H04W 76/14*     (2018.01)
*H04W 8/00*     (2009.01)
(Continued)

(52) U.S. Cl.
CPC .......... *H04W 76/14* (2018.02); *H04W 8/005* (2013.01); *H04W 56/001* (2013.01);
(Continued)

(58) Field of Classification Search
CPC ... H04W 76/023; H04W 8/005; H04W 92/18; H04W 4/005; H04W 76/021;
(Continued)

(56) References Cited

U.S. PATENT DOCUMENTS

2012/0087314 A1*   4/2012   Maeda .................... H04L 5/001
                                                                    370/328
2013/0308551 A1*   11/2013   Madan .................. H04W 76/14
                                                                    370/329

(Continued)

FOREIGN PATENT DOCUMENTS

JP       201334165 A     2/2013
WO      2013066126 A1    5/2013
(Continued)

OTHER PUBLICATIONS

Extended European Search Report issued in the counterpart European Patent Application No. 15788780.3, dated Apr. 13, 2017 (6 pages).

(Continued)

*Primary Examiner* — Yuwen Pan
*Assistant Examiner* — Fatuma G Sherif
(74) *Attorney, Agent, or Firm* — Osha Bergman Watanabe & Burton LLP

(57) ABSTRACT

A user equipment apparatus for performing user equipment-to-user equipment communication includes a synchronization signal detection unit configured to detect a user equipment-to-user equipment synchronization signal transmitted from a user equipment apparatus in another cell or another carrier; a control unit configured to set reception timing based on the user equipment-to-user equipment synchronization signal; and a reception unit configured to receive scheduling information or a discovery signal transmitted from the user equipment apparatus in the other cell or the
(Continued)

other carrier within a time window defined based on the user equipment-to-user equipment synchronization signal.

3 Claims, 12 Drawing Sheets

(51) Int. Cl.
    *H04W 92/18*     (2009.01)
    *H04W 56/00*     (2009.01)
    *H04W 72/12*     (2009.01)

(52) U.S. Cl.
    CPC ........ *H04W 92/18* (2013.01); *H04W 56/0025* (2013.01); *H04W 72/1289* (2013.01)

(58) Field of Classification Search
    CPC ............... H04W 76/14; H04W 56/001; H04W 56/0025; H04W 72/1289
    USPC ................................................ 455/41.2, 509
    See application file for complete search history.

(56) References Cited

U.S. PATENT DOCUMENTS

| | | | |
|---|---|---|---|
| 2014/0120934 A1 | 5/2014 | Kishiyama | |
| 2014/0269641 A1* | 9/2014 | Jang | H04L 5/0053 370/336 |
| 2015/0126210 A1* | 5/2015 | Peng | H04L 5/001 455/452.1 |

FOREIGN PATENT DOCUMENTS

| | | |
|---|---|---|
| WO | 2013181785 A1 | 12/2013 |
| WO | 2015/008749 A1 | 1/2015 |

OTHER PUBLICATIONS

International Search Report issued in corresponding application No. PCT/JP2015/060996 dated May 19, 2015 (3 pages).
Written Opinion of the International Searching Authority issued in corresponding application No. PCT/JP2015/060996 dated May 19, 2015 (5 pages).
NTT COCOMO, Inc., "Discussion on synchronization of D2D discovery"; 3GPP TSG RAN WG1 Meeting #74bis, R1-134502; Guangzhou, China; Oct. 7-11, 2013 (5 pages).
3GPP TR 36.843 V12.0.1, "3rd Generation Partnership Project; Technical Specification Group Radio Access Network; Study on LTE Device to Device Proximity Services; Radio Aspects (Release 12)"; Mar. 2014 (50 pages).
Office Action issued in the counterpart Japanese Patent Application No. 2016-517845, dated Sep. 5, 2017 (5 pages).
Office Action issued in corresponding Australian Application No. 2015257148, dated Aug. 2, 2018 (3 pages).
Examination Report issued in corresponding Australian Application No. 2015257148, dated Nov. 27, 2018 (3 pages).
Office Action issued in the counterpart Chinese Patent Application No. 201580023526.4, dated Mar. 25, 2019 (19 pages).
Office Action issued in Chinese Application No. 201580023526.4, dated Aug. 27, 2019 (20 pages).
Notification of Re-Examination issued in Chinese Application No. 201580023526.4, dated Apr. 29, 2020 (16 pages).

* cited by examiner

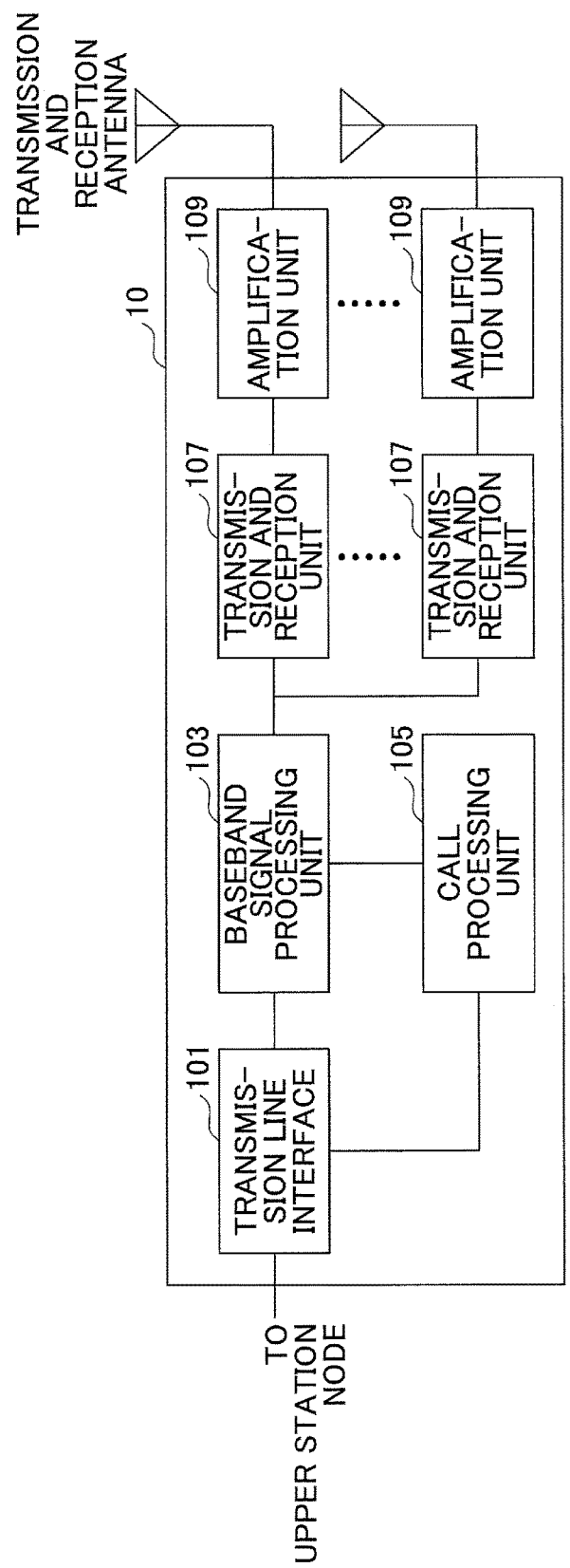

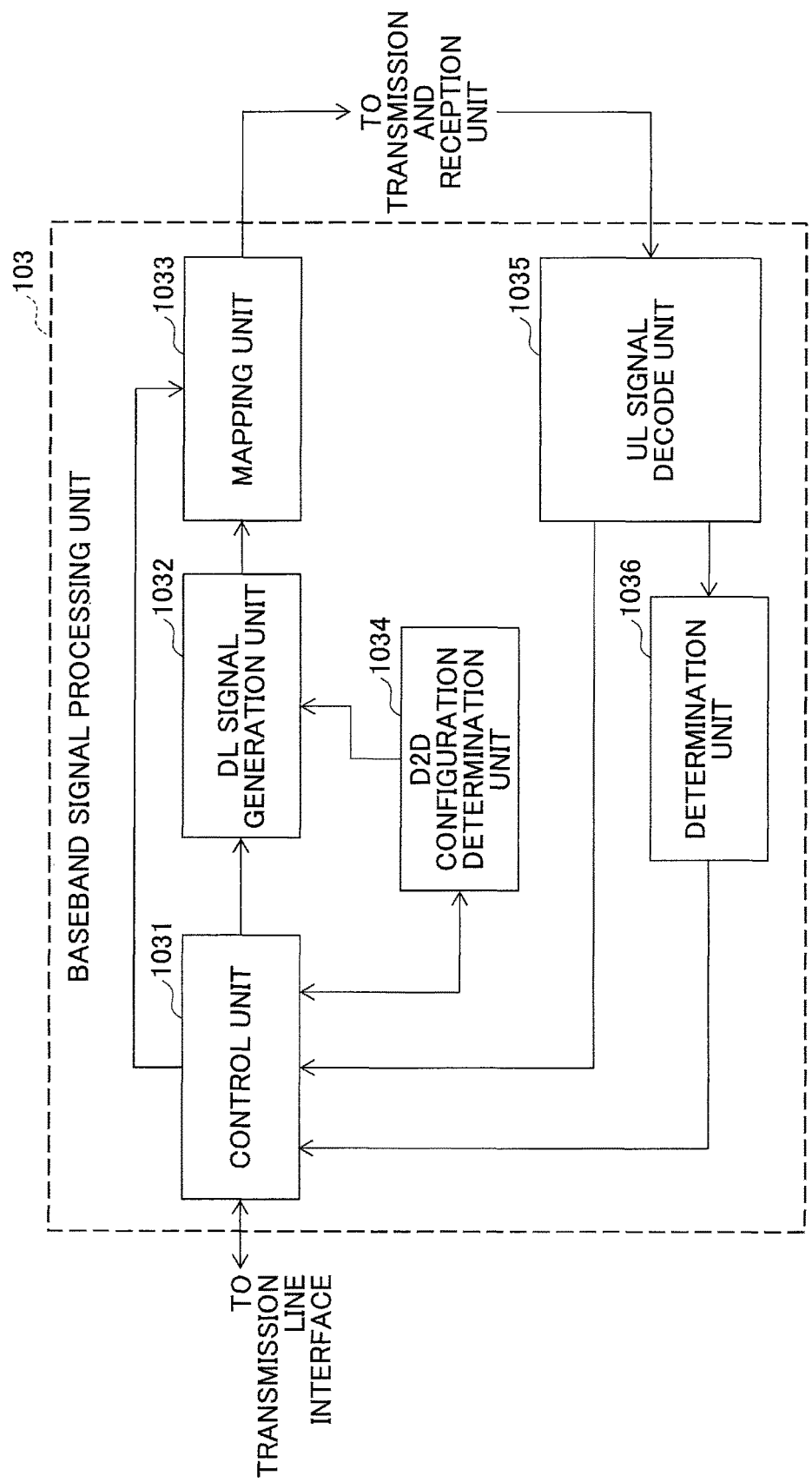

USER EQUIPMENT APPARATUS AND SIGNAL RECEPTION METHOD

TECHNICAL FIELD

The present invention relates to a user equipment apparatus and a signal reception method.

BACKGROUND ART

In mobile communication, communication between terminals (hereinafter referred to as "user equipment apparatuses") UEs is typically performed by means of communication between the user equipment apparatuses UEs and a base station eNB. Recently, various techniques for direct communication between user equipment apparatuses UEs are under discussion (see Non-Patent Document 1). The direct communication between user equipment apparatuses UEs is referred to as "D2D (Device to Device) communication" or "user equipment-to-user equipment communication".

In order to realize a service application limited to proximate user equipment apparatuses UEs, one user equipment apparatus UE needs to discover another proximate user equipment apparatus UE. As a scheme for discovering a user equipment apparatus UE, each user equipment apparatus UE can transmit (broadcast) a discovery signal including its own ID, an application service ID, and so on.

FIGS. 1A and 1B show a discovery of a user equipment apparatus in D2D communication. As shown FIG. 1A, resources for D2D communication are multiplexed with resources for cellular communication (hereinafter referred to as "WAN"). Multiplexing is performed using FDM (Frequency Division Multiplexing), TDM (Time Division Multiplexing), the combination of TDM and FDM, or the like. A user equipment apparatus can transmit a discovery signal using the resources for D2D communication.

As shown in FIG. 1B, a base station eNB1 in a cell 1 notifies a user equipment apparatus UE1 within the cell 1 of a group of resources (time-frequency resources) available for signal transmission among the resources for D2D communication. The group of resources is referred to as a "transmission resource pool". Similarly, a base station eNB2 in a cell 2 notifies a user equipment apparatus UE2 within the cell 2 of a transmission resource pool.

The user equipment apparatuses UE1 and UE2 transmit a discovery signal using either resources within the transmission resource pools provided by the base stations eNB1 and eNB2 or resources individually specified by the base stations eNB1 and eNB2, respectively. When the user equipment apparatus UE2 receives a discovery signal from the user equipment apparatus UE1 in the other cell, the user equipment apparatus UE2 can discover the user equipment apparatus UE1. It should be noted that a predetermined resource pool may be used outside the coverage of the base stations eNBs.

In order for the user equipment apparatus UE1 to transmit D2D data to the user equipment apparatus UE2, the user equipment apparatus UE1 transmits scheduling information (SA: Scheduling Assignment) indicating a resource position of the D2D data. In a similar manner to the discovery signal, the SA is transmitted using either resources within the transmission resource pools provided by the base stations eNB1 and eNB2 or resources individually specified by the base stations eNB1 and eNB2, respectively. It should be noted that a predetermined resource pool may be used outside the coverage of the base stations eNBs. The SA includes allocation information of a resource in which D2D data are transmitted. When the user equipment apparatus UE2 receives an SA from the user equipment apparatus UE1 in the other cell, the user equipment apparatus UE2 can receive D2D data from the user equipment apparatus UE1.

PRIOR ART DOCUMENT

Non-Patent Document

[Non-Patent Document 1] 3GPP TR 36.843 V12.0.1 (2014-03)

DISCLOSURE OF INVENTION

Problem(s) to be Solved by the Invention

To facilitate transmission and reception of scheduling information (SA) or a discovery signal among cells as described above, a synchronization signal is used between user equipment apparatuses.

FIG. 2 shows synchronization between user equipment apparatuses in D2D communication. The base station eNB1 transmits a synchronization signal to the user equipment apparatus UE1 on a PSS (Primary Synchronization Channel) or an SSS (Secondary Synchronization Channel). Upon receiving the synchronization signal from the base station eNB1, the user equipment apparatus UE1 controls transmission and reception timing based on the received synchronization signal. Similarly, the base station eNB2 transmits a synchronization signal to the user equipment apparatus UE2 on the PSS or the SSS. Upon receiving the synchronization signal from the base station eNB2, the user equipment apparatus UE2 controls transmission and reception timing based on the received synchronization signal.

On the other hand, transmission and reception timing is not always aligned among cells. In order to facilitate D2D communication among cells, the user equipment apparatuses UE1 and UE2 can transmit a synchronization signal, so as to align the transmission and reception timing of the user equipment apparatuses UE1 and UE2. The synchronization signal for D2D communication between the user equipment apparatuses UE1 and UE2 is referred to as a "D2DSS (D2D Synchronization Signal)" or a "user equipment-to-user equipment synchronization signal".

Upon synchronization using the PSS/SSS or the D2DSS, the user equipment apparatus can detect scheduling information (SA: Scheduling Assignment) or a discovery signal transmitted from another user equipment apparatus.

As described above, an SA or a discovery signal is transmitted using resources within the transmission resource pools provided by the base stations eNB1 and eNB2, respectively. In order to receive an SA or a discovery signal transmitted from a user equipment apparatus within the own cell, the user equipment apparatuses UE1 and UE2 has to try reception within the transmission resource pool for the own cell. In addition, in order to receive an SA or a discovery signal transmitted from a user equipment apparatus within another cell, the user equipment apparatuses UE1 and UE2 has to try reception within the transmission resource pool for the other cell. Furthermore, when a plurality of D2DSSs are detected, in order to receive an SA or a discovery signal, the user equipment apparatus has to synchronize with a proper D2DSS in a proper subframe to receive signals from a plurality of cells. However, in this case, it is difficult to identify the proper D2DSS. Then, the user equipment apparatus has to try reception in all possible subframes, which may result in high battery consumption in the user equipment apparatus for receiving an SA or a discovery signal in the case of inter-cell D2D communication (D2D communication among cells). A similar problem may arise in the case of inter-carrier D2D communication (D2D communication among carriers).

It is an object of the present invention to efficiently detect scheduling information or a discovery signal transmitted in D2D communication among cells or among carriers.

Means for Solving the Problem(s)

In one aspect of the present invention, there is provided a user equipment apparatus for performing user equipment-to-user equipment communication, including:

a synchronization signal detection unit configured to detect a user equipment-to-user equipment synchronization signal transmitted from a user equipment apparatus in another cell or another carrier;

a control unit configured to set reception timing based on the user equipment-to-user equipment synchronization signal; and a reception unit configured to receive scheduling information or a discovery signal transmitted from the user equipment apparatus in the other cell or the other carrier within a time window defined based on the user equipment-to-user equipment synchronization signal.

In another aspect of the present invention, there is provided a signal reception method in a user equipment apparatus for performing user equipment-to-user equipment communication, including the steps of:

detecting a user equipment-to-user equipment synchronization signal transmitted from a user equipment apparatus in another cell or another carrier;

setting reception timing based on the user equipment-to-user equipment synchronization signal; and receiving scheduling information or a discovery signal transmitted from the user equipment apparatus in the other cell or the other carrier within a time window defined based on the user equipment-to-user equipment synchronization signal.

Advantageous Effect of the Invention

According to the present invention, it is possible to efficiently detect scheduling information or a discovery signal transmitted in D2D communication among cells or among carriers.

BRIEF DESCRIPTION OF THE DRAWINGS

FIG. 7 shows a block diagram of a base station in accordance with an embodiment of the present invention.

FIG. 8 shows a block diagram of a baseband signal processing unit in a base station in accordance with an embodiment of the present invention.

DETAILED DESCRIPTION OF THE PREFERRED EMBODIMENTS

Embodiments of the present invention are described below with reference to the drawings.

<Overview of a Communication System>

Figure 3:
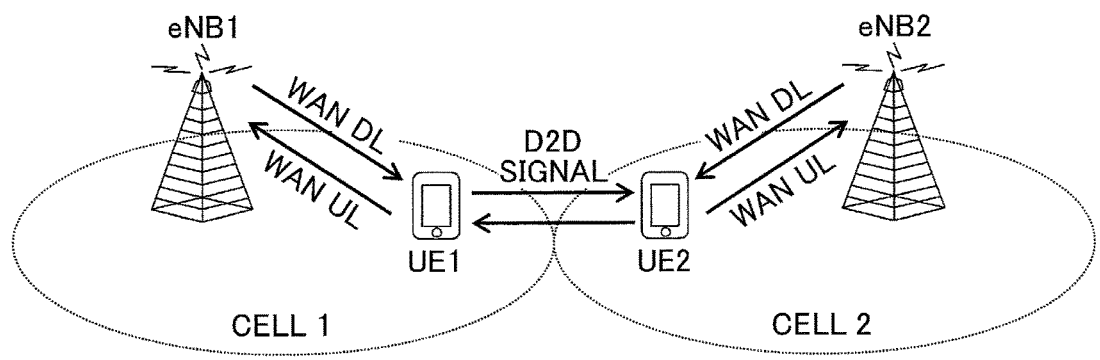
FIG. 3 shows a conceptual diagram of a communication system in accordance with an embodiment of the present invention.

FIG. 3 shows a conceptual diagram of a communication system in accordance with an embodiment of the present invention. The communication system in accordance with the embodiment of the present invention is a cellular communication system in which a plurality of user equipment apparatuses UEs are situated within a cell of a base station eNB. While the communication system typically includes a plurality of base stations eNBs and a plurality of user equipment apparatuses UEs, FIG. 3 shows two base stations eNB1 and eNB2 and two user equipment apparatuses UE1 and UE2 among them. Although not shown in FIG. 3, a user equipment apparatus for performing D2D communication may be situated outside the cell. While the following description is based on an assumption that the two base stations eNB1 and eNB2 belong to the same carrier, the two base stations eNB1 and eNB2 may belong to different carriers.

Figure 1A:
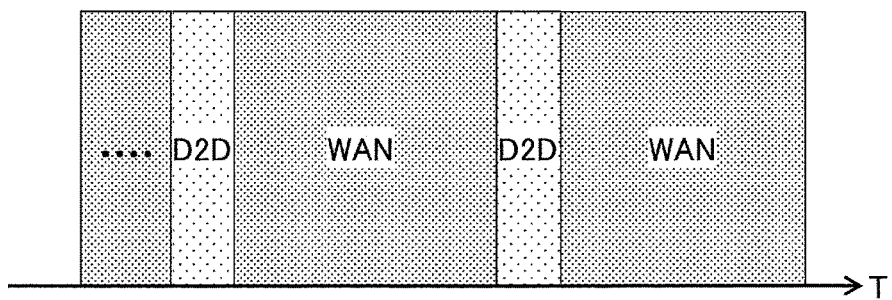
FIG. 1A shows a discovery of a user equipment apparatus in D2D communication (resources for D2D communication).
Figure 1B:
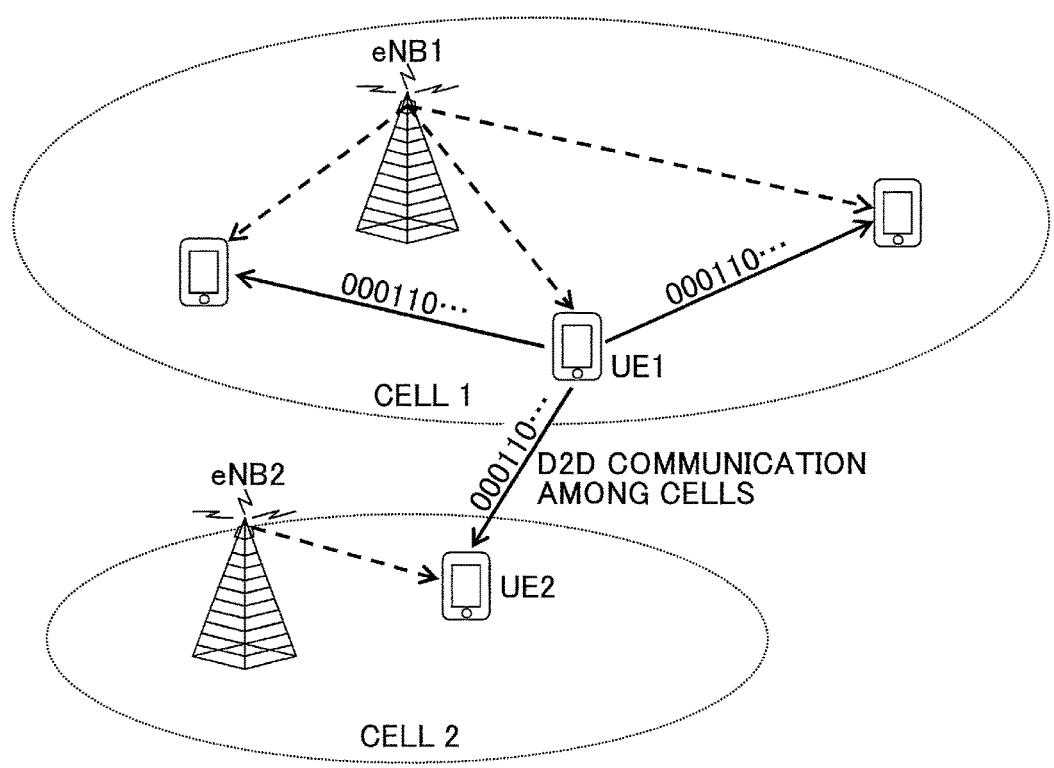
FIG. 1B shows a discovery of a user equipment apparatus in D2D communication (transmission and reception of a discovery signal in D2D communication).
Figure 2:
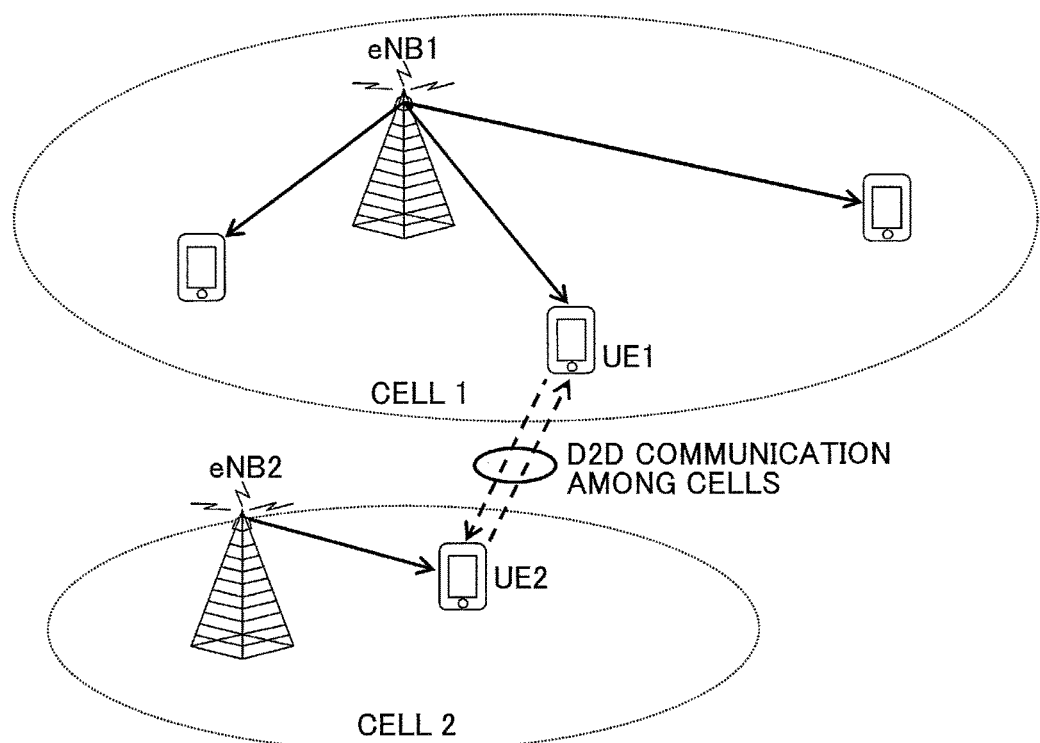
FIG. 2 shows synchronization between user equipment apparatuses in D2D communication.

The base station eNB1 communicates with the user equipment apparatus UE1 within its own cell 1 using resources for WAN. Similarly, the base station eNB2 communicates with the user equipment apparatus UE2 within its own cell 2 using resources for WAN. The user equipment apparatus UE1 can bypass the base stations eNB1 and eNB2 and directly communicate with the user equipment apparatus UE2 using resources for D2D communication. The resources for WAN and the resources for D2D communication are multiplexed as shown in FIG. 1A, for example.

The base station eNB1 notifies the user equipment apparatus UE1 within the cell 1 of a group of resources (transmission resource pool) available for transmission of a D2D signal. Similarly, the base station eNB2 notifies the user equipment apparatus UE2 within the cell 2 of a group of resources (transmission resource pool) available for transmission of a D2D signal.

Figure 4:
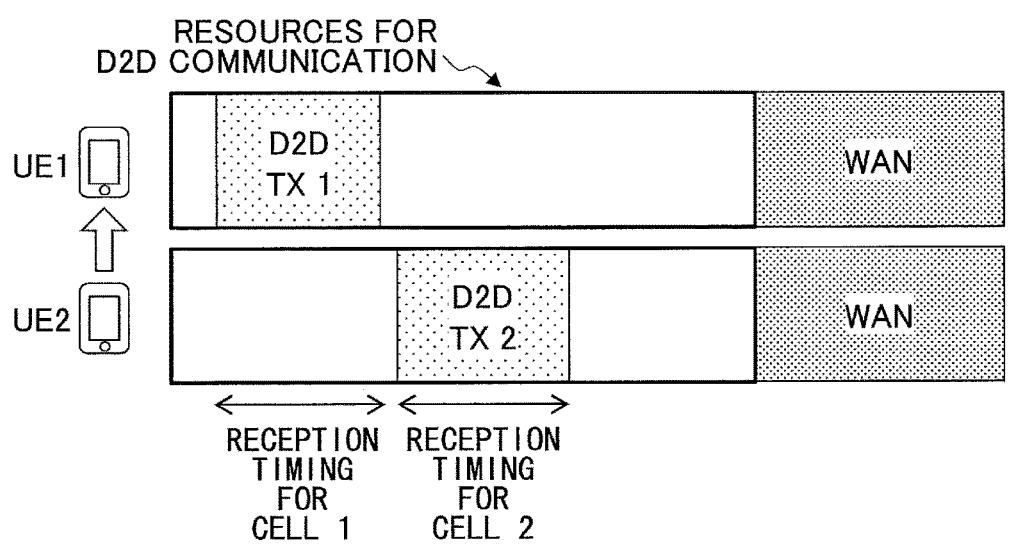
FIG. 4 shows a transmission resource pool in D2D communication.

FIG. 4 shows a transmission resource pool in D2D communication. The resources for D2D communication may include a transmission resource pool used in common among cells or a transmission resource pool for each cell. For example, a transmission resource pool for the cell 1 may be a predetermined portion of all the resources for D2D communication. A transmission resource pool may be defined for each cell. In other words, different time-frequency resources are used for a transmission resource pool for the cell 1 and a transmission resource pool for the cell 2.

A D2D signal may be received in the transmission resource pool for the own cell from a user equipment apparatus within the own cell, and a D2D signal may be also received in the transmission resource pool for another cell from a user equipment apparatus within the other cell. More specifically, the user equipment apparatus UE1 within the cell 1 receives a D2D signal in a transmission resource pool (D2D TX 1) for the cell 1 from a user equipment apparatus within the cell 1. The user equipment apparatus UE1 also receives a D2D signal in a transmission resource pool (D2D TX 2) for the cell 2 from a user equipment apparatus within the cell 2. Thus, the resources for D2D communication including the transmission resource pools for the own cell and another cell are also referred to as a "reception resource pool". The reception resource pool may be provided from the base stations eNB1 and eNB2. The transmission/reception resource pool may be contiguous or discontiguous in the time and/or frequency dimension. The transmission/reception resource pool may be defined for each D2D signal or for each transmission scheme of D2D signals, or may be shared among a plurality of D2D signals or among a plurality of transmission schemes of D2D signals.

Transmission and reception timing is not always aligned among cells. In order to facilitate inter-cell D2D communication, the user equipment apparatuses UE1 and UE2 have to transmit a synchronization signal (D2DSS or user equipment apparatus-to-user equipment synchronization signal), so as to align the transmission and reception timing.

The user equipment apparatus UE2 transmits a D2DSS using a resource within the transmission resource pool provided by the base station eNB2 or a resource individually specified by the base station eNB2. When the user equipment apparatus UE1 detects the D2DSS transmitted from the user equipment apparatus UE2, the user equipment apparatus UE1 sets reception timing based on the detected D2DSS.

Then, the user equipment apparatus UE1 tries to receive scheduling information (SA) or a discovery signal from the user equipment apparatus UE2. In an embodiment of the present invention, the user equipment apparatus UE1 may try to receive an SA or a discovery signal within a time window defined based on the D2DSS, rather than try to receive an SA or a discovery signal in all the resources for D2D communication. This can reduce power consumption in the user equipment apparatus. The operations in the user equipment apparatus UE1 are described in detail below.

Figure 5:
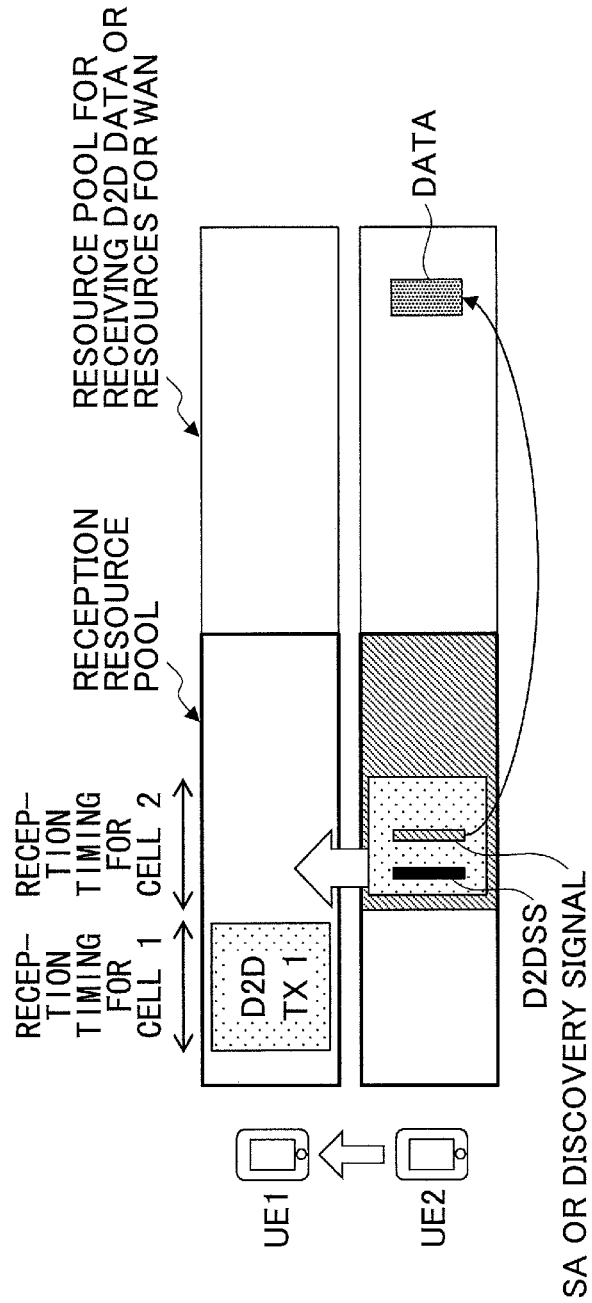
FIG. 5 shows a conceptual diagram of reception timing in a user equipment apparatus in accordance with an embodiment of the present invention.

FIG. 5 shows a conceptual diagram of reception timing in a user equipment apparatus in accordance with an embodiment of the present invention.

The user equipment apparatus UE2 within the cell 2 transmits a D2DSS before an SA or a discovery signal. Transmission of the D2DSS by the user equipment apparatus UE may be restricted under control of the base station eNB. For example, by means of higher layer signaling from the base station eNB, the base station eNB may prohibit some user equipment apparatuses UEs from transmitting a D2DSS. Alternatively, the base station eNB may specify a user equipment apparatus UE which can transmit a D2DSS.

When the user equipment apparatus UE1 within the cell 1 detects a D2DSS in a resource (for example, the transmission resource pool for the cell 2) that is included in the resources for D2D communication but does not fall within the transmission resource pool for the own cell, the user equipment apparatus UE1 sets reception timing based on the D2DSS. The user equipment apparatus UE1 may determine whether a D2DSS for the own cell is transmitted in the transmission resource pool for the own cell, and only when a D2DSS for the own cell is not transmitted, the user equipment apparatus UE1 may set reception timing based on a D2DSS for another cell or another carrier. According to this operation, an SA or a discovery signal for another cell or another carrier can be received even if transmission resource pools overlap among cells in the time domain.

In an embodiment of the present invention, an SA or a discovery signal transmitted from the user equipment apparatus UE2 is arranged based on the position (resource position) of the D2DSS. More specifically, an SA or a discovery signal is transmitted within a predetermined time window from the position (resource position) of the D2DSS. Accordingly, after detecting a D2DSS, the user equipment apparatus UE1 receives an SA or a discovery signal from the user equipment apparatus UE2 within a time window defined based on the D2DSS. The time window may be configured in the user equipment apparatus in advance, may be provided by means of higher layer signaling from the base station eNB1 such as broadcast information (SIB: System Information Block) or RRC (Radio Resource Control) signaling, or may be included in a D2DSS or a PD2DSCH (Physical D2D Synchronization Channel) transmitted from the user equipment apparatus UE2. The time window may consist of contiguous subframes or noncontiguous subframes. For example, when a resource pool can be defined as a subset of all the subframes, the time window may be defined in the subframes which can be used as the resource pool.

When the user equipment apparatus UE1 receives an SA within the time window, the user equipment apparatus UE1 receives D2D data from the user equipment apparatus UE2 at a resource allocation position indicated by the SA. It should be noted that the D2D data from the user equipment apparatus UE2 may be received within the resource pool for D2D data communication or within resources for WAN. In addition, the user equipment apparatus UE1 may maintain reception timing which is set based on the D2DSS received from the user equipment apparatus UE2 until D2D data are received from the user equipment apparatus UE2 and use the reception timing for reception of the D2D data.

Rather than using the time window to associate a D2DSS and an SA or a discovery signal, a similar operation can be implemented by associating a component of a D2DSS and a transmission resource pool (a reception resource pool from the viewpoint of a receiving user equipment apparatus) for each cell. Specifically, the component (for example, ID) of the D2DSS and information about the transmission resource pool for the cell may be provided by means of higher layer signaling (including RRC signaling and SIB).

<Resource Mapping>

Figure 6A:
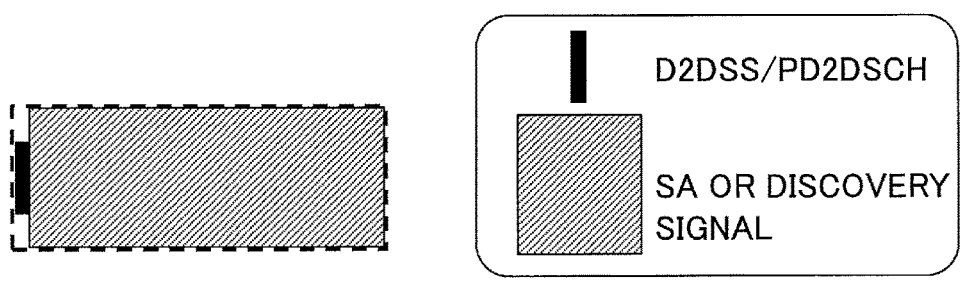
FIG. 6A shows a transmission resource pool used in an embodiment of the present invention.
Figure 6B:
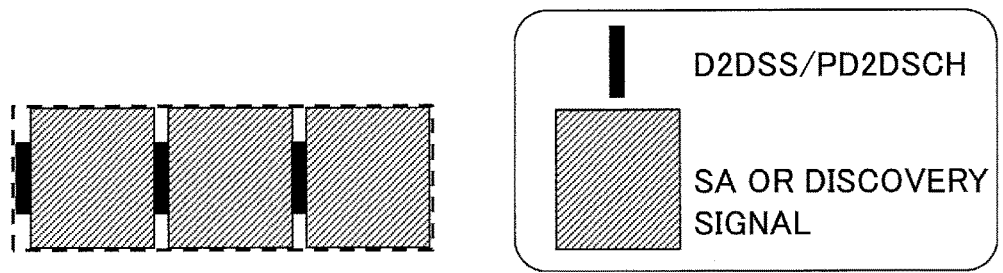
FIG. 6B shows a transmission resource pool used in an embodiment of the present invention.

Next, an example of mapping a signal to a transmission resource pool is described below. FIGS. 6A and 6B show a transmission resource pool used in an embodiment of the present invention.

As shown in FIG. 6A, a D2DSS is mapped to a predetermined resource within the transmission resource pool. For example, the D2DSS may be mapped to the first symbol in the first subframe or a symbol indicated by means of higher layer signaling such as SIB or RRC signaling.

When a PD2DSCH is used, the PD2DSCH may be mapped to a predetermined resource within the transmission resource pool. Alternatively, the PD2DSCH may be mapped to a predetermined resource whose resource position is defined relative to the resource position of the D2DSS. Since a D2DSS is needed to receive the PD2DSCH, the PD2DSCH may be mapped to a later subframe or symbol than the D2DSS. For example, the PD2DSH may be mapped to the second subframe or a later symbol than the D2DSS in the first subframe. In addition, the PD2DSCH may be transmitted using the same frequency resource as the D2DSS.

An SA or a discovery signal is transmitted between the subframe following the D2DSS or the PD2DSCH and the last subframe within the transmission resource pool.

Alternatively, as shown in FIG. 6B, the transmission resource pool may be divided into a plurality of sub-resources using one or more D2DSSs. Within the sub-resource, mapping as shown in FIG. 6A is applied. Specifically, a D2DSS is mapped to a predetermined symbol (for example, the first symbol in the first subframe) within the sub-resource. When a PD2DSCH is used, the PD2DSCH is mapped to a predetermined subframe (for example, the second subframe or a later symbol than the D2DSS in the first subframe) within the sub-resource. An SA or a discovery signal is transmitted between the subframe following the D2DSS or the PD2DSCH and the last subframe within the sub-resource.

When the transmission resource pool is divided into a plurality of sub-resources, the user equipment apparatus may try to receive an SA or a discovery signal within at least one sub-resource of the plurality of divided sub-resources. The sub-resource during which the user equipment apparatus tries reception may be provided by means of higher layer signaling from the base station such as SIB or RRC signaling.

It should be noted that the number of subframes within the sub-resource may be stored in advance in the user equipment apparatus and the base station. The user equipment apparatus and the base station can divide the transmission resource pool based on the number of subrames stored in advance and identify the position of the D2DSS or the like. Alternatively, the base station may notify the user equipment apparatus of a plurality of sub-resources upon notifying the user equipment apparatus of the transmission resource pool.

Alternatively, the number of subframes within the sub-resource may be associated with information about a D2DSS or the like. For example, the number of subframes within the sub-resource may be associated with symbol mapping, an ID, a cyclic shift, an OCC (Orthogonal Cover Code), or the like of the D2DSS. The user equipment apparatus can receive the D2DSS or the like, determine the number of subframes within the sub-resource, and identify the position of the D2DSS or the like.

<Configuration of a Base Station>

FIG. 7 shows a block diagram of a base station (eNB) 10 in accordance with an embodiment of the present invention. The base station 10 includes a transmission line interface 101, a baseband signal processing unit 103, a call processing unit 105, a transmission and reception unit 107, and an amplification unit 109.

Data to be transmitted from the base station 10 to a user equipment apparatus through downlink are input from the upper station node to the baseband signal processing unit 103 via the transmission line interface 101.

The baseband signal processing unit 103 performs PDCP (Packet Data Convergence Protocol) layer processing, data segmentation/concatenation, RLC (Radio Link Control) layer transmission processing such as RLC retransmission control, MAC (Medium Access Control) retransmission control such as HARQ (Hybrid Automatic Repeat reQuest) transmission control, scheduling, transport format selection, channel coding, IFFT (Inverse Fast Fourier Transform) processing, and precoding processing. In addition, regarding a signal on a physical downlink control channel that is a type of a downlink control channel, the baseband signal processing unit 103 performs transmission processing such as channel coding and IFFT.

The call processing unit 105 performs call processing such as configuration and release of a communication channel, state management of the base station 10, and radio resource management.

The transmission and reception unit 107 frequency-converts the baseband signal output from the baseband signal processing unit 103 to a radio frequency band signal. The amplification unit 109 amplifies the frequency-converted transmission signal and outputs the signal to a transmission and reception antenna. When a plurality of transmission and reception antennas are used, a plurality of transmission and reception units 107 and a plurality of amplification units 109 may be provided.

Regarding a signal transmitted from a user equipment apparatus to the base station 10 through uplink, a radio frequency signal received by the transmission and reception antenna is amplified by the amplification unit 109, frequency-converted to a baseband signal by the transmission and reception unit 107, and input to the baseband signal processing unit 103.

The baseband signal processing unit 103 performs FFT (Fast Fourier Transform) processing, IDFT (Inverse Discrete Fourier Transform) processing, error correction decoding, reception processing for the MAC retransmission control, RLC layer reception processing, and PDCP layer reception processing of data included in the baseband signal received through uplink. The decoded signal is forwarded to the upper station node via the transmission line interface 101.

FIG. 8 shows a block diagram of the baseband signal processing unit 103 in the base station 10 in accordance with the embodiment of the present invention. The baseband signal processing unit 103 includes a control unit 1031, a downlink (DL) signal generation unit 1032, a mapping unit 1033, a D2D configuration determination unit 1034, an uplink (UL) signal decode unit 1035, and a determination unit 1036.

The control unit 1031 performs total management of the baseband signal processing unit 103. To transmit a signal to a user equipment apparatus through downlink, the control unit 1031 provides data input from the transmission line interface 101 to the DL signal generation unit 1032. Upon receiving a signal from a user equipment apparatus through uplink, the control unit 1031 provides data decoded by the UL signal decode unit 1035 to the transmission line interface 101.

The DL signal generation unit 1032 generates a signal to be transmitted to a user equipment apparatus. A signal to be transmitted to a user equipment apparatus includes data and control information. The data is mainly transmitted on a PDSCH (Physical Downlink Shared Channel) and allocation information which is necessary to receive the PDSCH is transmitted on a PDCCH (Physical Downlink Control Channel) or an ePDCCH (enhanced PDCCH). The DL signal generation unit 1032 also generates a synchronization signal for D2D communication. The synchronization signal is transmitted on the PSS or the SSS. In addition, the DL signal generation unit 1032 generates a signal including D2D configuration information for D2D communication. The D2D configuration information is transmitted by means of higher layer signaling such as SIB or RRC (Radio Resource Control) signaling. The D2D configuration information may be also transmitted on the PDCCH or the ePDCCH.

The mapping unit 1033 places data to be transmitted on the PDSCH or control information to be transmitted on the PDCCH or the ePDCCH on a resource determined by a scheduling unit (not shown). The mapping unit 1033 also places the synchronization signal and the D2D configuration information for D2D communication on a predetermined resource.

The D2D configuration determination unit 1034 determines D2D configuration information for D2D communication. For example, the D2D configuration determination information 1034 determines one or any combination of the following information items.

(1) Inter-Cell Synchronization Information

Inter-cell synchronization information means a synchronization timing difference among cells or an absolute synchronization time and includes a cell ID or a D2DSS ID and synchronization timing, for example. The inter-cell synchronization information is used to synchronize reception timing in a user equipment apparatus in inter-cell D2D communication.

(2) Transmission Resource Pools for the Own Cell and Another Cell

The base station may transmit not only a resource pool for the own cell but also a resource pool for another cell. When mapping as shown in FIG. 6A or 6B is used for the transmission resource pool, a user equipment apparatus can synchronize with another cell and identify a position of a D2DSS based on the transmission resource pool for the other cell.

In addition to the transmission resource pools for the own cell and another cell, the base station may also transmit a cell ID. The user equipment apparatus can synchronize with another cell based on the PSS and/or the SSS transmitted from a base station in the other cell. Furthermore, a virtual cell ID, a user equipment apparatus ID (UE ID), a D2DSS ID, or the like may be transmitted, and relative synchronization timing between transmission resource pools may be transmitted.

When a user equipment apparatus obtains synchronization information for another cell by means of measurement, the user equipment apparatus may receive a signal transmitted within the resource pool for the other cell without detecting a D2DSS.

(3) A Time Window for Detecting an SA or a Discovery Signal

A time window is defined with reference to the position (resource position) of the D2DSS. A user equipment apparatus need only detect an SA or a discovery signal within the provided time window. When the number of neighbor cells or carriers is large, reception timing can be efficiently switched.

(4) A D2D Carrier List and a Transmission Resource Pool

A D2D carrier list is a list of one or more carriers which provide D2D communication (may include an operator ID). When a user equipment apparatus receives the D2D carrier list, the user equipment apparatus can limit candidates of D2D carriers to efficiently receive a signal in each carrier. In addition to the D2D carrier list, a transmission or reception resource pool may be transmitted.

When a user equipment apparatus obtains synchronization information or broadcast information for another carrier by means of cell search and measurement, the user equipment apparatus may receive a signal transmitted within the resource pool for the other carrier without detecting a D2DSS.

(5) Information about Whether to Transmit a D2DSS

The base station may instruct a user equipment apparatus to transmit or not to transmit a D2DSS. The user equipment apparatus which is instructed by the base station to transmit a D2DSS can transmit the D2DSS, thereby reducing power consumption in the user equipment apparatus. For example, the base station may instruct a user equipment apparatus situated at the center of the cell not to transmit a D2DSS and instruct a user equipment apparatus situated at the cell edge to transmit a D2DSS. This is because the user equipment apparatus situated at the center of the cell is less likely to perform inter-cell D2D communication.

(6) Resource Mapping within a Transmission Resource Pool

The base station may transmit resource mapping within a transmission resource pool as described with reference to FIG. 6A or 6B to a user equipment apparatus.

(7) Subframes During which a D2D Signal can be Received for a Terminal Equipped with a Shared WAN/D2D Receiver As described below, a user equipment apparatus can share a receiver for WAN and D2D communication. This type of user equipment apparatus is referred to as a "terminal equipped with a shared WAN/D2D receiver". Since the terminal equipped with the shared WAN/D2D receiver cannot receive a D2D signal while a WAN signal is being received, the base station may notify the terminal equipped with the shared WAN/D2D receiver of subframes during which a D2D signal can be received.

The UL signal decode unit 1035 decodes a signal received from a user equipment apparatus through uplink. Data received on a PUSCH (Physical Uplink Shared Channel) are input to the control unit 1031 to provide the data to the transmission line interface 101. Acknowledge information (ACK/NACK) received on the PUCCH is also input to the control unit 1031 for retransmission processing such as HARQ.

The determination unit 1036 determines whether to retransmit a signal received on the PUSCH. When the reception of the signal on the PUSCH is successful, the determination unit 1036 generates acknowledgement information (ACK) indicating that retransmission is not needed. When the reception of the signal on the PUSCH has failed, the determination unit 1036 generates acknowledgement information (NACK) indicating that retransmission is needed.

<Configuration of a User Equipment Apparatus>

Figure 9:
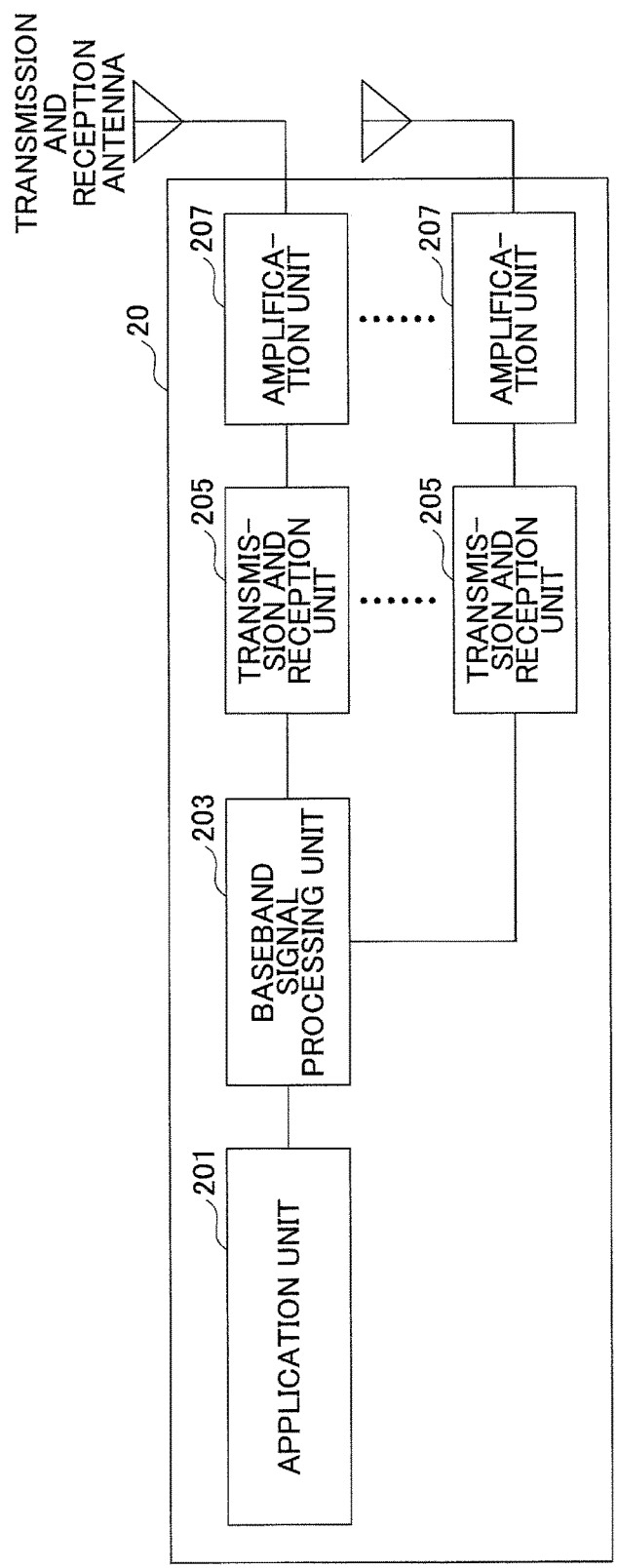
FIG. 9 shows a block diagram of a user equipment apparatus in accordance with an embodiment of the present invention.

FIG. 9 shows a block diagram of a user equipment apparatus 20 in accordance with an embodiment of the present invention. The user equipment apparatus 20 includes an application unit 201, a baseband signal processing unit 203, a transmission and reception unit 205, and an amplification unit 207.

Regarding downlink data, a radio frequency signal received by a transmission and reception antenna is amplified by the amplification unit 207, and frequency-converted to a baseband signal by the transmission and reception unit 205. The baseband signal processing unit 203 performs reception processing of the baseband signal such as FFT processing, error correction decoding, and retransmission control. Downlink user data in the downlink data are forwarded to the application unit 201. The application unit 201 performs processing on a higher layer than the physical layer or the MAC layer, for example.

On the other hand, uplink data are input from the application unit 201 to the baseband signal processing unit 203. The baseband signal processing unit 203 performs transmission processing for retransmission control, channel encoding, DFT processing, and IFFT processing. The transmission and reception unit 205 converts a baseband signal output from the baseband signal processing unit 203 to a radio frequency band signal. Then, the signal is amplified by the amplification unit 207 and transmitted from the transmission and reception antenna.

Figure 10:
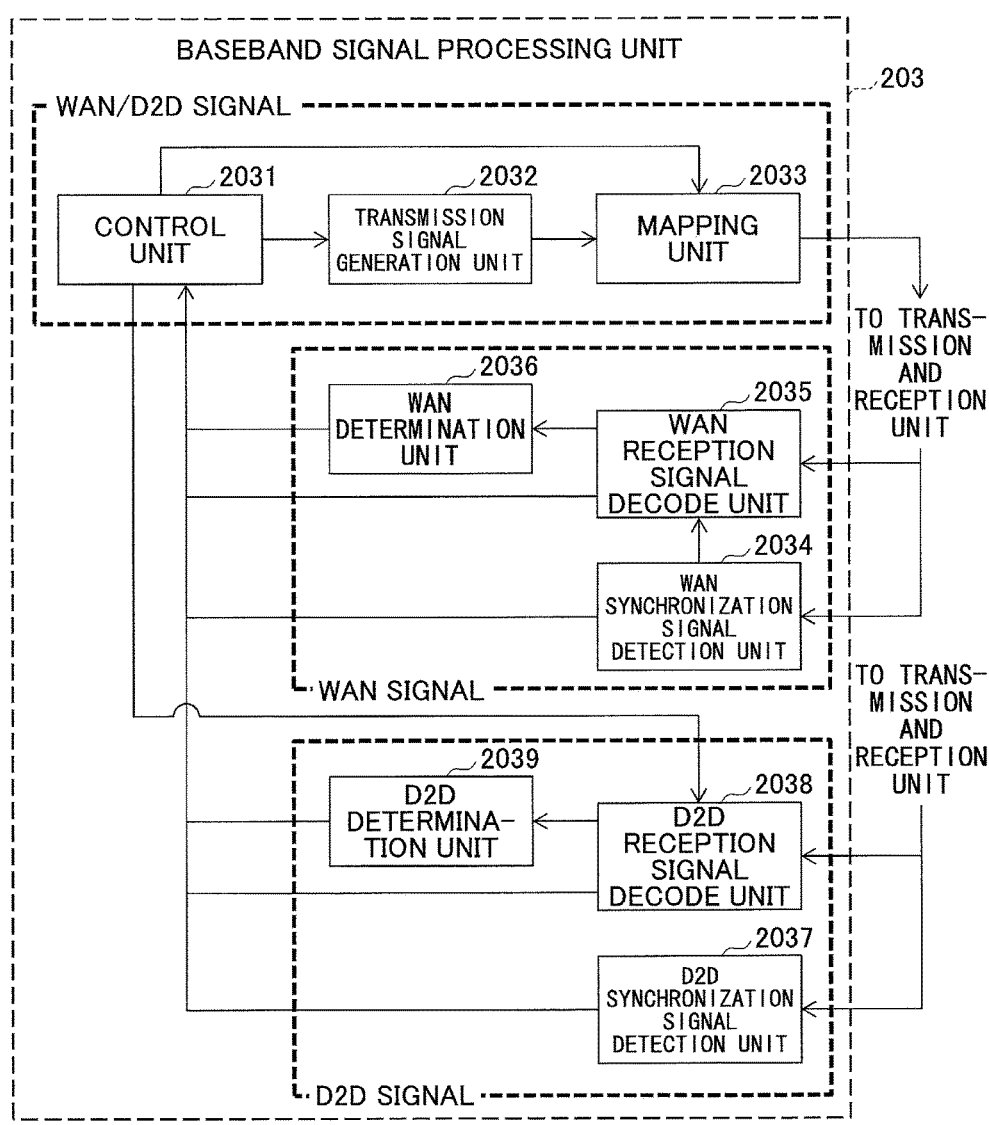
FIG. 10 shows a block diagram of a baseband signal processing unit in a user equipment apparatus in accordance with an embodiment of the present invention (a terminal equipped with independent WAN/D2D receivers).

FIG. 10 shows the baseband signal processing unit 203 in the user equipment apparatus 20 in accordance with the embodiment of the present invention. FIG. 10 shows the baseband signal processing unit 203 in a terminal equipped with independent WAN/D2D receivers in which independent receivers are provided for WAN and D2D communication. The baseband signal processing unit 203 includes a control unit 2031, a transmission signal generation unit 2032, a mapping unit 2033, a WAN synchronization signal detection unit 2034, a WAN reception signal decode unit 2035, a WAN determination unit 2036, a D2D synchronization signal detection unit 2037, a D2D reception signal decode unit 2038, and a D2D determination unit 2039.

The control unit 2031 performs total management of the baseband signal processing unit 203. To transmit a signal to a base station through uplink, the control unit 2031 provides data input from the application unit 201 to the transmission signal generation unit 2032. Upon receiving a signal from a base station through downlink, the control unit 2031 provides data processed by the WAN signal decode unit 2035 and the D2D reception signal decode unit 2038 to the application unit 201.

In addition, the control unit 2031 sets reception timing based on a synchronization signal (PSS/SSS or D2DSS) detected by the WAN synchronization signal detection unit 2034 and the D2D synchronization signal detection unit 2037. When a downlink signal is received from the base station in the own cell or when a D2D signal is received from a user equipment apparatus in the own cell, the control unit 2031 sets reception timing based on the synchronization signal detected by the WAN synchronization signal detection unit 2034. When a D2D signal is received from a user equipment apparatus in another cell or another carrier, the control unit 2031 sets reception timing based on the D2DSS detected by the D2D synchronization signal detection unit 2037.

More specifically, when a D2DSS is detected in a resource that is included in resources for D2D communication but does not fall within the transmission resource pool for the own cell, the control unit 2031 can identify that an SA or a discovery signal may be received from a user equipment apparatus in another cell or another carrier within a predetermined time window from the position (resource position) of the D2DSS. For this reason, the control unit 2031 sets reception timing based on the detected D2DSS. Similarly, in the resource pool for the own cell, the D2D synchronization signal detection unit 2037 detects whether a D2DSS is transmitted in the own cell, and only when a D2DSS is not transmitted in the own cell, the control unit 2031 may set reception timing based on the D2DSS for another cell or another carrier.

The transmission signal generation unit 2032 generates a signal to be transmitted to the base station or another user equipment apparatus. A signal to be transmitted to the base station includes data and control information. The data is mainly transmitted on the PUSCH. In addition, acknowledgement information (ACK/NACK) of data received from the base station on the PDSCH is transmitted on the PUCCH. The signal to be transmitted to the base station is transmitted in a resource for WAN. A signal to be transmitted to another user equipment apparatus includes a D2DSS, an SA, a discovery signal, and D2D data. Among them, the D2DSS, the SA, and the discovery signal are transmitted within the transmission resource pool for D2D communication provided by the base station. The D2D data may be transmitted within the resource pool for D2D data communication or the resources for WAN.

The mapping unit 2033 places data to be transmitted on the PUSCH on a resource determined by the scheduling unit of the base station. The mapping unit 2033 also places a D2DSS, an SA, and a discovery signal to be transmitted to another user equipment apparatus on resources within the transmission resource pool provided by the base station. In addition, the mapping unit 2033 places D2D data to be transmitted to another user equipment apparatus on a resource allocation position indicated by the SA.

The WAN synchronization signal detection unit 2034 detects a synchronization signal transmitted on the PSS/SSS from the base station. Since a predetermined signal sequence is used for the synchronization signal, the WAN synchronization signal detection unit 2034 can detect the synchronization signal by using correlation detection or the like.

The WAN reception signal decode unit 2035 decodes a signal received from the base station through downlink. Data received on the PDSCH is input to the control unit 2031 to be provided to the application unit 201.

As described above, a signal received by the WAN reception signal decode unit 2035 includes one or any combination of the following information items: (1) inter-cell synchronization information, (2) transmission resource pools for the own cell and another cell, (3) a time window for detecting an SA or a discovery signal, (4) a D2D carrier list and a transmission resource pool, (5) information about whether to transmit a D2DSS, (6) resource mapping within a transmission resource pool, and (7) subframes during which a D2D signal can be received for a terminal equipped with a shared WAN/D2D receiver.

The inter-cell synchronization information is used by the control unit 2031 to synchronize reception timing in inter-cell D2D communication. For example, the control unit 2031 sets reception timing for receiving a D2D signal from a user equipment apparatus in another cell based on the synchronization signal transmitted from the base station in the own cell and the inter-cell synchronization information.

The transmission resource pools for the own cell and the other cell are used by the control unit 2031 to synchronize reception timing in inter-cell D2D communication. For example, the control unit 2013 sets reception timing for receiving a D2D signal from a user equipment apparatus in the other cell based on the synchronization signal transmitted from a base station in the other cell and the transmission resource pool for the other cell.

The time window for detecting an SA or a discovery signal is used by the D2D reception signal decode unit 2038 to receive the SA or the discovery signal. The D2D reception signal decode unit 2038 tries to receive an SA or a discovery signal within the time window.

The D2D carrier list and the transmission resource pool is used by the D2D reception signal decode unit 2038 to limit candidates of carriers to detect a D2D signal. The D2D reception signal decode unit 2038 tries to receive a D2D signal in frequencies and periods of time for the carriers specified based on the D2D carrier list and the transmission resource pool.

The information about whether to transmit a D2DSS is used by the control unit 2031 to control the transmission signal generation unit 2032, the mapping unit 2033, and the transmission and reception unit 205 as to whether to allow transmission of a D2DSS. For example, when a user equipment apparatus is situated at the center of the cell and is instructed not to transmit a D2DSS, the control unit 2031 does not allow the transmission signal generation unit 2032, the mapping unit 2033, and the transmission and reception unit 205 to perform transmission processing of the D2DSS. When a user equipment apparatus is situated at the cell edge and is instructed to transmit a D2DSS, the control unit 2031 allows the transmission signal generation unit 2032, the mapping unit 2033, and the transmission and reception unit 205 to perform transmission processing of the D2DSS.

The resource mapping within a transmission resource pool is used by the D2D reception signal decode unit 2038 to receive a D2DSS. For example, when the transmission resource pool is divided into a plurality of sub-resources, the D2D reception signal decode unit 2038 receives a D2D signal within a sub-resource specified by the base station among the divided sub-resources.

The subframes during which a D2D signal can be received for a terminal equipped with a shared WAN/D2D receiver are described in detail below.

The WAN determination unit 2036 determines whether to retransmit a signal received on the PDSCH. When reception of the signal on the PDSCH is successful, the WAN determination unit 2036 generates acknowledgement information (ACK) indicating that retransmission is not needed. When reception of the signal on the PDSCH has failed, the WAN determination unit 2036 generates acknowledgement information (NACK) indicating that retransmission is needed.

The D2D synchronization signal detection unit 2037 detects a D2DSS transmitted from the other user equipment apparatus. Since a predetermined signal sequence is used for the D2DSS, the D2D synchronization signal detection unit 2037 can detect the D2DSS by using correlation detection or the like.

The D2D reception signal decode unit 2038 decodes a signal received from another user equipment apparatus. D2D data included in the decoded signal is input to the control unit 2031 to be provided to the application unit 201. The signal received by the D2D reception signal decode unit 2038 may include a time window for detecting an SA or a discovery signal.

The D2D determination unit 2039 determines whether to retransmit a received D2D signal. When reception of the D2D signal is successful, the D2D determination unit 2039 generates acknowledgement information (ACK) indicating that retransmission is not needed. When reception of the D2D signal has failed, the D2D determination unit 2039 generates acknowledgement information (NACK) indicating that retransmission is needed.

Figure 11:
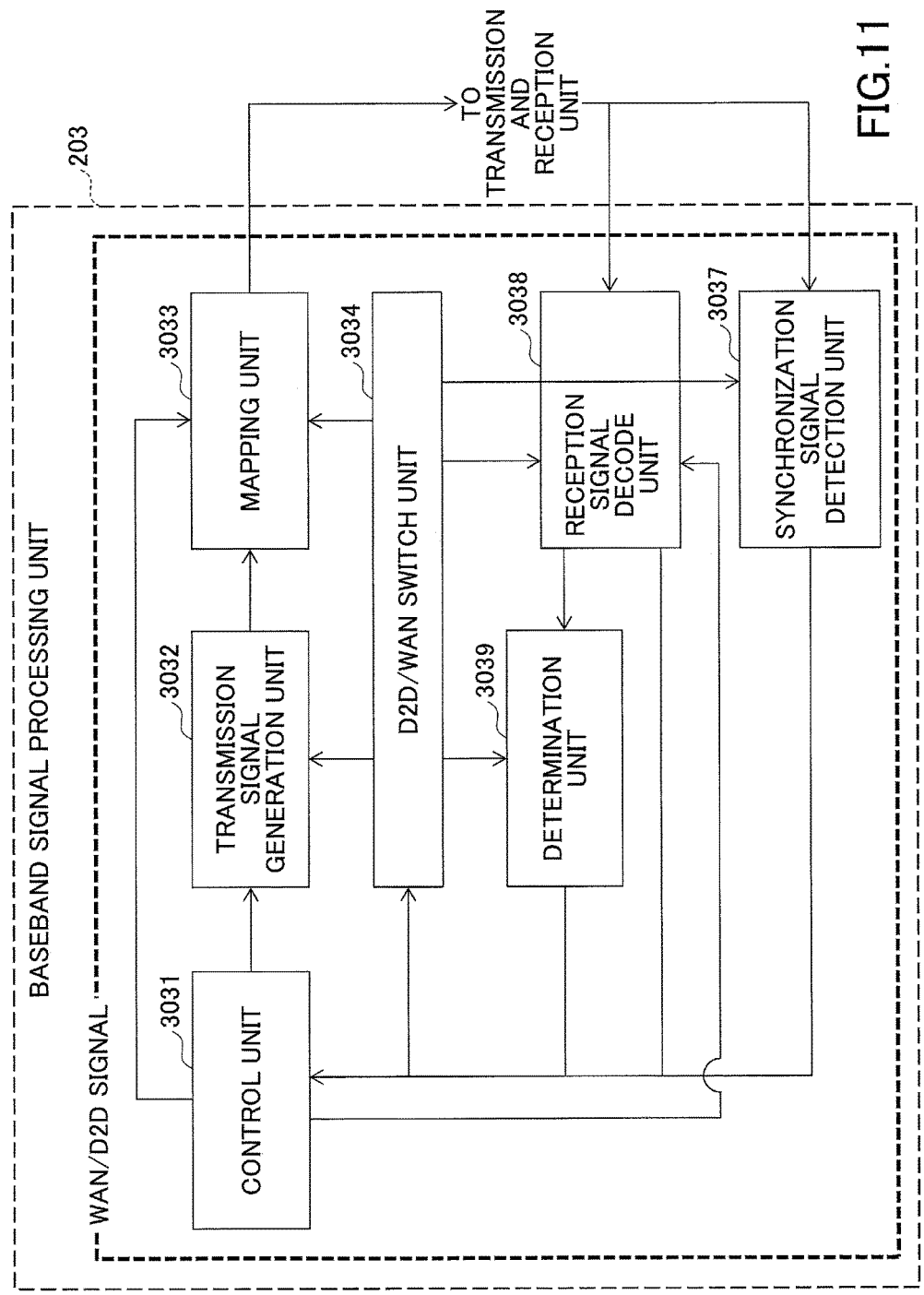
FIG. 11 shows a block diagram of a baseband signal processing unit in a user equipment apparatus in accordance with an embodiment of the present invention (a terminal equipped with a shared WAN/D2D receiver).

FIG. 11 shows the baseband signal processing unit 203 in the user equipment apparatus 20 in the embodiment of the present invention. FIG. 11 shows the baseband signal processing unit 203 in a terminal equipped with a shared WAN/D2D receiver, in which a receiver is shared between WAN and D2D communication. The baseband signal processing unit 203 includes a control unit 3031, a transmission signal generation unit 3032, a mapping unit 3033, a D2D/WAN switch unit 3034, a synchronization signal detection unit 3037, a reception signal decode unit 3038, and a determination unit 3039.

The control unit 3031, the transmission signal generation unit 3032, and the mapping unit 3033 are the same as the control unit 2031, the transmission signal generation unit 2032, and the mapping unit 2033, respectively, which are described with reference to FIG. 10.

Since the synchronization signal detection unit 3037, the reception signal decode unit 3038, and the determination unit 3039 are shared between WAN and D2D communication, the D2D/WAN switch unit 3034 is provided to switch between WAN and D2D communication. The D2D/WAN switch unit 3034 allows the synchronization signal detection unit 3037, the reception signal decode unit 3038, and the determination unit 3039 to process a D2D signal in a period of time during which the D2D signal is received. The D2D/WAN switch unit 3034 also allows the synchronization signal detection unit 3037, the reception signal decode unit 3038, and the determination unit 3039 to process a WAN signal in a period of time during which the WAN signal is received.

Similarly, processing in the transmission and reception unit 205 shown in FIG. 9 is switched in a time domain between WAN and D2D communication.

The reception signal decode unit 3038 receives a D2D signal in subframes during which reception of a WAN signal is not needed, in order to preferentially receive a signal transmitted from the base station.

Figure 12:
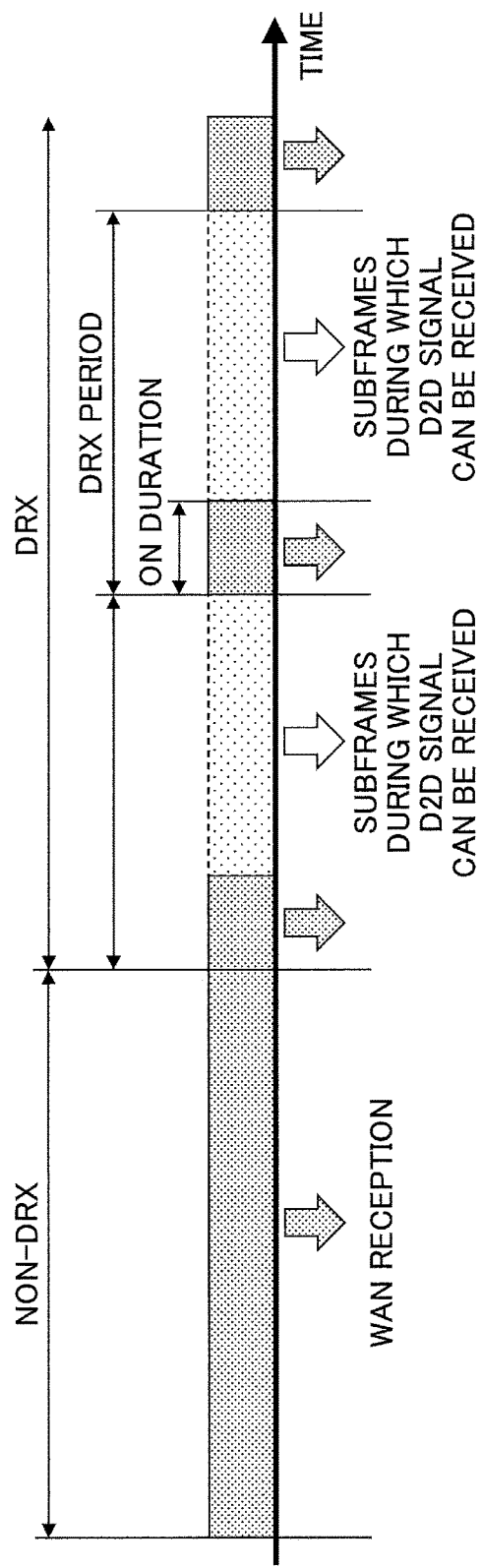
FIG. 12 shows a period of time during which a D2D signal can be received in a terminal equipped with a shared WAN/D2D receiver.

FIG. 12 shows a period of time during which a D2D signal can be received in a terminal equipped with a shared WAN/D2D receiver. For example, a user equipment apparatus in a connected state (RRC Connected) does not receive a WAN signal in a subframe other than an ON duration of DRX (discontinuous reception) or in a measurement gap which is provided to measure another frequency. Accordingly, the reception signal decode unit 3038 may receive a D2D signal in the subframe other than the ON duration of DRX or in the measurement gap. Even if a discovery signal is transmitted in the ON duration of DRX, the discovery signal may be detected in a next period, because the discovery signal is periodically transmitted.

Information about the subframes during which a D2D signal can be received for a terminal equipped with a shared WAN/D2D receiver may be received by the WAN reception signal decode unit 2035 from the base station. The information about the subframes during which a D2D signal can be received may be transmitted to all the user equipment apparatuses or one or more user equipment apparatuses which need to switch a receiver.

Instead of using the DRX or the measurement gap, the reception signal decode unit 3038 may control subframes during which a D2D signal can be received by providing a timer which is applied only to a user equipment apparatus which needs to switch a receiver. For example, after a predetermined period of time has elapsed since last receiving the PDCCH, that is, after a predetermined period of time has elapsed since receiving a signal for WAN communication, the reception signal decode unit 3038 may be switched in order to process a signal for D2D communication. Alternatively, by using periodic subframes provided from the base station eNB by means of higher layer signaling such as RRC signaling for D2D reception, the reception signal decode unit 3038 may be switched in order to process a signal for D2D communication.

A user equipment apparatus in an idle state may receive a D2D signal in a subframe other than a subframe for monitoring a paging message.

The reception signal decode unit 3038 may receive a D2D signal in subframes corresponding to resources (reception resource pool) allocated to D2D communication among subframes during which a D2D signal can be received.

<D2D Signal Transmission and Reception Method>

Figure 13:
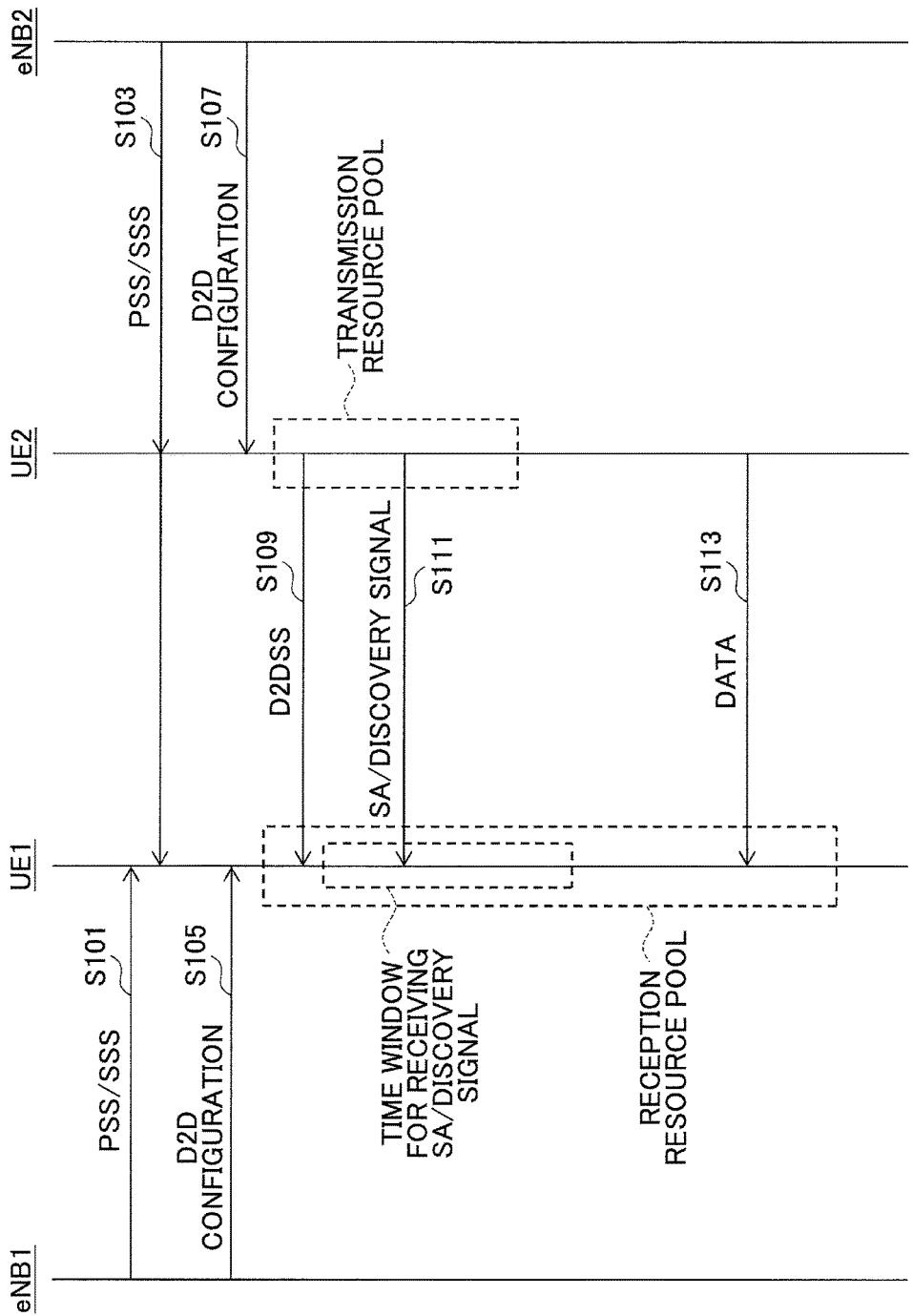
FIG. 13 shows a sequence diagram of a signal transmission and reception method in a communication system in accordance with an embodiment of the present invention.

FIG. 13 shows a sequence diagram of a signal transmission and reception method in a communication system in accordance with an embodiment of the present invention.

A base station eNB1 transmits synchronization information (PSS/SSS) to a user equipment apparatus UE1 within the own cell (step S101). The user equipment apparatus UE1 controls reception timing based on the synchronization information received from the base station eNB1. Similarly, a base station eNB2 transmits synchronization information (PSS/SSS) to a user equipment apparatus UE2 within the own cell (step S103). The user equipment apparatus UE2 controls reception timing based on the synchronization information received from the base station eNB2. The synchronization information transmitted by the base station eNB2 may be received by the user equipment apparatus in another cell.

The base station eNB1 transmits D2D configuration information to the user equipment apparatus UE1 (step S105). The D2D configuration information includes a transmission resource pool for the own cell or the like. In order to facilitate detection of a D2D signal by the user equipment apparatus UE1, the D2D configuration information may include (1) inter-cell synchronization information, (2) transmission resource pools for the own cell and another cell, (3) a time window for detecting an SA or a discovery signal, (4) a D2D carrier list and a transmission resource pool, (5) information about whether to transmit a D2DSS, (6) resource mapping within a transmission resource pool, (7) subframes during which a D2D signal can be received for a terminal equipped with a shared WAN/D2D receiver, or the like. Similarly, the base station eNB2 transmits D2D configuration information to the user equipment apparatus UE2 (step S107).

The user equipment apparatus UE2 transmits a D2DSS using a resource within the transmission resource pool provided by the base station eNB2 (step S109). When the user equipment apparatus UE1 detects the D2DSS transmitted from the user equipment apparatus UE2, the user equipment apparatus UE1 sets reception timing based on the detected D2DSS. Then, the user equipment apparatus UE1 tries to receive an SA or a discovery signal within a time window defined based on the D2DSS (step S111). The user equipment apparatus UE1 may also set reception timing based on the D2D configuration information and try to receive an SA or a discovery signal.

The SA indicates a resource to be used to transmit D2D data. In this resource, the user equipment apparatus UE1 receives D2D data transmitted from the user equipment apparatus UE2 (step S113).

In this manner, an SA or a discovery signal can be efficiently detected by the reception of the SA or the discovery signal using the time window as well as by the use of the D2D configuration information to facilitate detection of a D2D signal.

Effects of Embodiments of the Present Invention

According to an embodiment of the present invention, it is possible to efficiently detect scheduling information or a discovery signal transmitted in D2D communication between cells. As a result, power consumption in a user equipment apparatus can be reduced.

In addition, by receiving D2D configuration information such as inter-cell synchronization information, power consumption in a user equipment apparatus can be further reduced. For example, when a user equipment apparatus can identify a position of a D2DSS in another cell using the D2D configuration information, the user equipment apparatus need not detect the D2DSS.

While a user equipment apparatus includes a terminal equipped with independent WAN/D2D receivers and a terminal equipped with a shared WAN/D2D receiver, both of the terminals can implement D2D communication according to the embodiment of the present invention. Since reception processing of a D2D signal varies depending on the implementation of the terminal, the user equipment apparatus UE may signal a terminal capability to the base station eNB. For example, a terminal capability such as D2D communication scheme supported by the terminal (transmission and reception of a discovery signal (Discovery), transmission and reception of data (Communication), or both of them), an indication whether a WAN signal and a D2D signal can be simultaneously received, the number of receivers shared between WAN and D2D communication, and a combination of a band which can be used to transmit a D2D signal, a band which can be used to receive a D2D signal, a band which can be used to simultaneously transmit and receive a D2D signal and a WAN signal, or the like may be signaled to the base station eNB. The terminal capability may be used by the base station eNB to determine the D2D configuration information for the user equipment apparatus UE, the number of applicable CCs (Component Carriers) in CA (Carrier Aggregation), or the like.

For convenience of explanation, the base station and the user equipment apparatus according to the embodiments of the present invention have been described with reference to functional block diagrams, but the base station and the user equipment apparatus may be implemented in hardware, software, or combinations thereof. In addition, two or more functional elements may be combined as appropriate. The method according to the embodiments of the present invention may be carried out in a different order from the order shown in the embodiments.

While the approaches are described above to efficiently detect scheduling information or a discovery signal transmitted in D2D communication among cells, the present invention is not limited to the embodiments, but various modifications and applications can be made by those skilled in the art within the scope of the claims.

The present international application is based on and claims the benefit of priority of Japanese Patent Application No. 2014-098138 filed on May 9, 2014, the entire contents of which are hereby incorporated by reference.

DESCRIPTION OF NOTATIONS

10 base station
101 transmission line interface
103 baseband signal processing unit
105 call processing unit
107 transmission and reception unit
109 amplification unit
1031 control unit
1032 downlink (DL) signal generation unit
1033 mapping unit
1034 D2D configuration determination unit 1035 uplink (UL) signal decode unit
1036 determination unit
20 user equipment apparatus
201 application unit
203 baseband signal processing unit
205 transmission and reception unit
207 amplification unit
2031 control unit
2032 transmission signal generation unit
2033 mapping unit
2034 WAN synchronization signal detection unit
2035 WAN reception signal decode unit
2036 WAN determination unit
2037 D2D synchronization signal detection unit
2038 D2D reception signal decode unit
2039 D2D determination unit
3031 control unit
3032 transmission signal generation unit
3033 mapping unit
3034 D2D/WAN switch unit
3037 synchronization signal detection unit
3038 reception signal decode unit
3039 determination unit

The invention claimed is:

1. A user equipment apparatus for performing user equipment-to-user equipment communication, comprising:
a transmission unit;
a first reception unit configured to receive a carrier list for user equipment-to-user equipment communication from a base station, wherein the carrier list includes information about an operator ID corresponding to the user equipment-to-user equipment communication;
a control unit that selects a carrier for the user equipment-to-user equipment communication based on the information about the operator ID; and
a second reception unit configured to receive a signal transmitted from another user equipment apparatus that operates in the carrier selected based on the information about the operator ID, wherein:
the first reception unit is configured to receive information about a transmission resource pool and/or a reception resource pool for user equipment-to-user equipment communication from the base station;
when information about the reception resource pool is received, the second reception unit is configured to receive the signal transmitted from the other user equipment apparatus based on the received information about the reception resource pool;
when information about the transmission resource pool is received, the transmission unit is configured to transmit a signal to the other user equipment apparatus based on the received information about the transmission resource pool, and
the user equipment apparatus and the other user equipment apparatus use the same transmission and/or reception resource pools for the user equipment-to-user equipment communication.

2. The user equipment apparatus as claimed in claim 1, further comprising a mapping unit configured to map a user equipment-to-user equipment synchronization signal to a predetermined resource within the transmission resource pool.

3. A signal reception method in a user equipment apparatus for performing user equipment-to-user equipment communication, comprising the steps of:
receiving a carrier list for user equipment-to-user equipment communication from a base station, wherein the carrier list includes information about an operator ID corresponding to the user equipment-to-user equipment communication;
selecting a carrier for the user equipment-to-user equipment communication based on the information about the operator ID;
receiving a signal transmitted from another user equipment apparatus that operates in the carrier selected based on the information about the operator ID; and
receiving information about a transmission resource pool and/or a reception resource pool for user equipment-to-user equipment communication from the base station;
when information about the reception resource pool is received, receiving the signal transmitted from the other user equipment apparatus based on the received information about the reception resource pool;
when information about the transmission resource pool is received, transmitting a signal to the other user equipment apparatus based on the received information about the transmission resource pool, and
wherein the user equipment apparatus and the other user equipment apparatus use the same transmission and/or reception resource pools for the user equipment-to-user equipment communication.

\* \* \* \* \*